US009935978B2

(12) United States Patent
Emerson et al.

(10) Patent No.: US 9,935,978 B2
(45) Date of Patent: Apr. 3, 2018

(54) POLICY APPLICATION FOR MULTI-IDENTITY APPS

(71) Applicant: Microsoft Technology Licensing, LLC, Redmond, WA (US)

(72) Inventors: Daniel Floyd Emerson, Gorham, ME (US); Jeremy Christopher Dorfman, Waltham, MA (US); Neil Adam Jacobson, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/491,006

(22) Filed: Sep. 19, 2014

(65) Prior Publication Data

US 2016/0088016 A1   Mar. 24, 2016

(51) Int. Cl.
*H04L 29/06* (2006.01)
*H04M 1/725* (2006.01)
*G06F 21/60* (2013.01)
*G06Q 10/10* (2012.01)

(52) U.S. Cl.
CPC ............ *H04L 63/20* (2013.01); *G06F 21/604* (2013.01); *G06Q 10/10* (2013.01); *H04M 1/72522* (2013.01); *H04M 1/72577* (2013.01); *G06F 2221/2105* (2013.01)

(58) Field of Classification Search
CPC .................. H04L 63/20; G06F 21/604; G06F 2221/2105; H04M 1/72522; H04M 1/72577
See application file for complete search history.

(56) References Cited

U.S. PATENT DOCUMENTS

| 2006/0122955 | A1  | 6/2006  | Bethlehem et al. |
|---|---|---|---|
| 2007/0214272 | A1  | 9/2007  | Isaacson |
| 2009/0170532 | A1* | 7/2009  | Lee ................... H04M 1/72566 455/456.3 |
| 2011/0145833 | A1* | 6/2011  | De Los Reyes ...... G06F 3/0488 718/106 |
| 2011/0252375 | A1* | 10/2011 | Chaudhri ............ G06F 3/04817 715/835 |
| 2012/0154413 | A1* | 6/2012  | Kim .................. H04M 1/72563 345/530 |

(Continued)

OTHER PUBLICATIONS

"Credential Management for Mobile Applications", Published on: Aug. 23, 2012 Available at: http://aws.amazon.com/code/4598681430241367.

(Continued)

*Primary Examiner* — Theodore C Parsons
(74) *Attorney, Agent, or Firm* — Workman Nydegger

(57) ABSTRACT

Controlling application behavior in the context of managed accounts. A device includes one or more applications. At least one of the applications is configured to be used with a plurality of user accounts including zero or more managed user accounts. The device includes or communicates with a client component. The client component is configured to identify active user accounts for the applications. The client component is further configured to receive policy from a management system, where the policy specifies application controls a user account basis. The client component is further configured to enforce application configuration based on the policy from the management system and the active user accounts.

20 Claims, 2 Drawing Sheets

(56) References Cited

U.S. PATENT DOCUMENTS

| | | | |
|---|---|---|---|
| 2012/0191677 A1* | 7/2012 | Lim | G06F 21/6218 |
| | | | 707/694 |
| 2012/0231764 A1* | 9/2012 | Lindteigen | H04L 63/083 |
| | | | 455/410 |
| 2013/0232541 A1 | 9/2013 | Kapadia et al. | |
| 2013/0290709 A1 | 10/2013 | Muppidi et al. | |
| 2013/0298185 A1 | 11/2013 | Koneru et al. | |
| 2014/0040977 A1* | 2/2014 | Barton | H04L 63/20 |
| | | | 726/1 |
| 2014/0165134 A1 | 6/2014 | Goldschlag et al. | |
| 2014/0189777 A1 | 7/2014 | Viswanathan et al. | |
| 2015/0172316 A1* | 6/2015 | Jacobson | H04L 63/20 |
| | | | 726/1 |

OTHER PUBLICATIONS

"Symplified Mobile SDK", Published on: Sep. 7, 2013 Available at: http://www.symplified.com/features/mobilesdk/.

"Implementing Policy-based Security", Retrieved on: Jul. 3, 2014 Available at: https://support.ca.com/cadocs/0/CA%20CloudMinder%20for%20Service%20Providers%201%2051-ENU/Bookshelf_Files/HTML/idocs/index.htm?toc.htm?346994.html.

Ding, Jianguo, "Policy-Based Network Management", Published on: May 29, 2011 Available at: http://www.ittoday.info/Articles/Policy-Based_Network_Management/Policy-Based_Network_Management.htm.

"Microsoft Solves BYOD Using Microsoft System Center Configuration Manager and Windows Intune", Published on: Nov. 2013 Available at: https://www.slideshare.net/Microsoft/2926-sccm-withwinintunetcs.

"Access Manager Devices and Their Features", Retrieved on: Jul. 3, 2014 Available at: http://www.novell.com/documentation/novellaccessmanager312/installation/data/b6jju7o.html?view=print.

"International Search Report & Written Opinion Issued in PCT Patent Application No. PCT/US2015/050543", dated Nov. 12, 2015, 10 Pages.

International Preliminary Report on Patentability issued in PCT Application No. PCT/US2015/050543, dated Dec. 6, 2016.

"Second Written Opinion Issued in PCT Application No. PCT/US2015/050543", dated Aug. 4, 2016, 6 Pages.

* cited by examiner

POLICY APPLICATION FOR MULTI-IDENTITY APPS

BACKGROUND

Background and Relevant Art

IT Administrators have long been able to target administrative policy to devices. With the advent of mobile devices there has been an expansion of policy targeting to include specific applications through industry solution like various mobile application management solutions available from various providers. In addition, users are increasingly using the same device for work and personal use or use at multiple companies. For example, a consultant or contractor may use the same device to access resources for different companies. This has resulted in applications supporting use by multiple accounts or identities. For example, a mail application may contain a personal inbox as well as one or more different corporate inboxes. In an alternative example, a cloud storage application may be able to connect to multiple different corporate services.

One challenge, however, is that IT administrative policy can only be applied holistically to a device or application. This has the undesirable side effect that applications that are used for multiple identities are constrained by the same policies. This limitation can reduce or remove functionality from an application for all identities even if the IT Administrators intent was only to manage a specific corporate identity. Presently, IT Administrators are forced to have the same policy for all identities in the application or to deploy multiple copies of the same application, or to only allow corporate access (while disallowing personal or other access) from a specific application, which leads to user confusion about which version should be used.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for controlling application behavior in the context of managed accounts. The method includes identifying an application state, including identifying a set of one or more user accounts including zero or more managed user accounts that are active for the application. The method further includes consulting policy with respect to the application state. The policy comprises one or more different policies defined for managed user accounts. Each different policy defines application configuration controls for one or more managed user accounts. Based on the policy and the application state; the method includes controlling an application's configuration with respect to the policy, including active user accounts with respect to the policy. The method includes identifying a changed application state, including a change to the set of one or more user accounts that are active for the application. The method further includes, based on policy and the changed application state, changing control of the application's configuration.

Another embodiment includes a computing device configured to control application behavior in the context of managed accounts. The device includes one or more applications. At least one of the applications is configured to be used with a plurality of user accounts including zero or more managed user accounts. The device includes a client component. The client component is configured to identify active user accounts for the applications. The client component is further configured to receive policy from a management system, where the policy specifies application controls on a user account basis. The client component is further configured to enforce application configuration based on the policy from the management system and the active user accounts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Embodiments herein allow an IT administrator to target specific identities with policy and client and/or application components enabling and enforcing policy only for the managed identities in a targeted application. In this way, policies can be applied to managed identities while not applying the policies to unmanaged identities. Further, different policies can be applied for different managed identities. In this way, policies that limit functionality are not applied when not required for a different identity to preserve functionality for some identities while also preserving management capabilities for other identities. Thus, for example, within the same application, a user may be restricted from cutting and pasting data when using a managed corporate identity (for use with an organization by which they are employed), but will not be so restricted when using a personal identity (for their own personal use).

Figure 1:
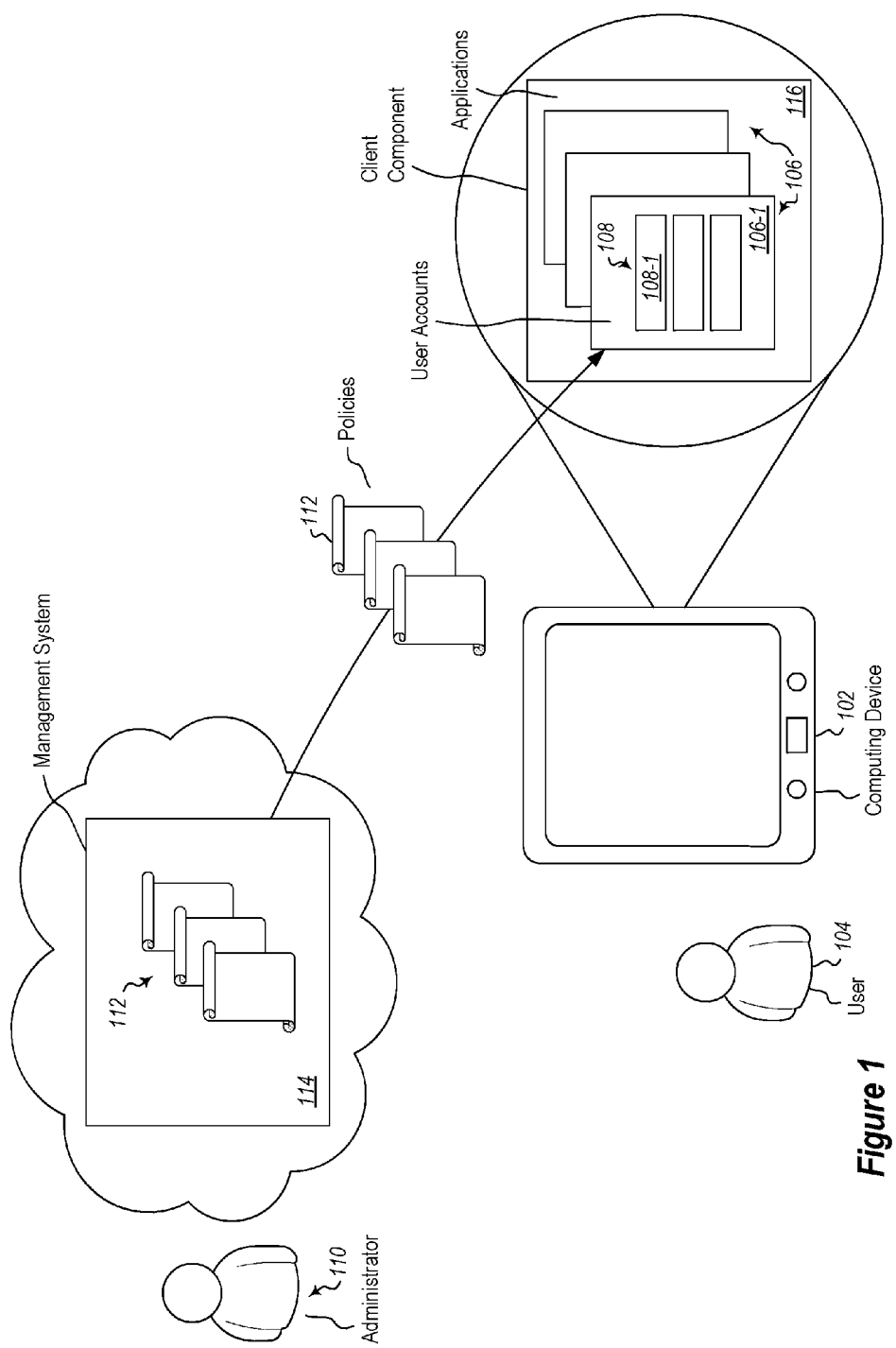
FIG. 1 illustrates an environment where application configuration is controlled based on active user accounts.

Referring now to FIG. 1, an example is illustrated. FIG. 1 illustrates a device 102. The device 102 may be a mobile phone, tablet, or other computing device as appropriate. The device 102 is typically owned by a user 104.

The device 102 may have stored thereon a plurality of applications 106. Each application may host a plurality of accounts 108. Thus, for example, an application 106-1 may be an email application with a personal account, and one or more managed corporate (or other organization) accounts. If the device 102 is used to access corporate accounts, the corporations (or other organization) associated with those accounts may wish to have certain restrictions on applications on the device 102 while those accounts are in use. For example, a corporation may not want cut/copy/paste functionality to be available in the application 106-1 when corporate data is being viewed. However, when the user uses a personal account 108-1, the corporation may not care, or may have no basis for controlling, if cut/copy/paste functionality is enabled. However, the user 104 may wish for such functionality to be enabled. Embodiments may support different policy for the same user on different devices. For example, on a stock traders mobile device, some application functionality may be locked down, but on the stock traders laptop or tablet on the trade floor, the functionality is not locked down.

An IT administrator 110 creates management policies 112 at a management system 114 for one or more applications. The IT administrator 110 can create policies that target specific users of an application and cause the policies to be deployed to devices for the users. Alternatively or additionally, the IT administrator can create policies that target specific domains instead of users. For example, all users of a certain site address will have the same policy applied to them.

As illustrated in FIG. 1, the management system 114 deploys the policies 112 to an appropriate application 106-1. A client component 116 at the device 102 interprets and process the policies 112.

When the user 104 launches the application 106-1, they will need to explicitly (e.g. by entering credentials, picking an account, etc.) or implicitly (e.g. based on content viewed, files accessed, account in-focus, etc.) identify themselves. The application 106-1 will inform the client component 116 of the active identities and the client component 116 will enforce the policies.

In the event that the application user interface needs to change to properly enforce the policy, the client component 116 informs the application 106-1. For example if the application supports saving content to arbitrary locations, the client component may inform the application it needs to limit saving destinations to a specific list or to block specific locations, if the policies 112 so specify. In one example embodiments, there are two aspects to consider. One is the changing the user interface based on the new policy (limiting save as in the example). The second is a callback within the application called from the Software Development Kit (SDK). Embodiments would notify the application that the active user needs to immediately change for the application to change the active account. Consider the example where the application only supports one active account at a time and they use that to display the right information on the screen (email, shared files, etc). If there is incoming data associated with a different user, the app also changes the application view to display the appropriate information associated with the new account.

As illustrated above, a policy management system can target and deploy policy to a specific user identity or account for one or more applications on a device.

The policy management system may include functionality to invoke operations (e.g. wiping data) for a specific user identity or account for one or more applications on a device.

The client component 116 of the policy management system may be implemented, in some embodiments, using the SDK for a device. The client component 116 may include various features for receiving and enforcing policy. For example, the client component 116 may include functionality for communicating with the policy management system 114 to receive policy targeting one or more identities or accounts within the application. The client component 116 further includes functionality for communicating with an application (such as application 106-1) to enforce policy targeting one or more identities or accounts within the application. The client component 116 may include functionality to report status of policy for one or more identities or accounts within the application to a remote component of the management system 114.

The client component 116 may include functionality that allows the application 106-1 to inform the client component 116 of the current active identities in the application so that the client component 116 can enforce the appropriate policies. The client component 116 may include functionality that allows the application 106-1 to inform the client component 116 of the identity associated with data (e.g. files or data buffers) so that the client component can enforce the appropriate policies. The client component 116 may include functionality that allows the client component 116 to inform the application 106-1 that specific user interface elements in the application 106-1 (e.g. "Save As" targets, cut/copy/paste functionality, etc.) must be limited based on policy. The client component 116 may include functionality that allows the client component 116 to inform the application 106-1 that the current active account and any associated data displayed must be changed to a new account. This may be communicated, for example, using a defined schema, programmatic methods, or through other appropriate means.

Thus, one example embodiment may include the following four components:

(1) A managed application (such as application 106-1)—in the illustrated example, this is an application that is managed by a policy management system (such as the policy management system 114) and that receives policy (such as policy 112) for one or more identities.

(2) A client/app component (such as client component 116) of the policy management system—in the illustrated example, this is an SDK that facilitates communication between the service and the application and to automatically enforce policies. In general, this could be implemented directly by the application. In some embodiments, this may be provided using features of Intune or Configuration Manager available from Microsoft Corporation of Redmond, Wash. In another example, a service may replace the concept of the SDK—meaning that the application talks to a service over a defined protocol.

(3) A policy management system (such as the policy management service 114)—in the illustrated example, this is the interface to the IT Pro to create, target and deploy policy to identities or accounts within managed applications. In some embodiments, this may be implemented using Intune or Configuration Manager available from Microsoft Corporation of Redmond, Wash.

(4) A communication schema—in the illustrated example, this is a versioned XML schema (or other schema) that describes the user interface restrictions the application must enforce based on policy and active identities.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
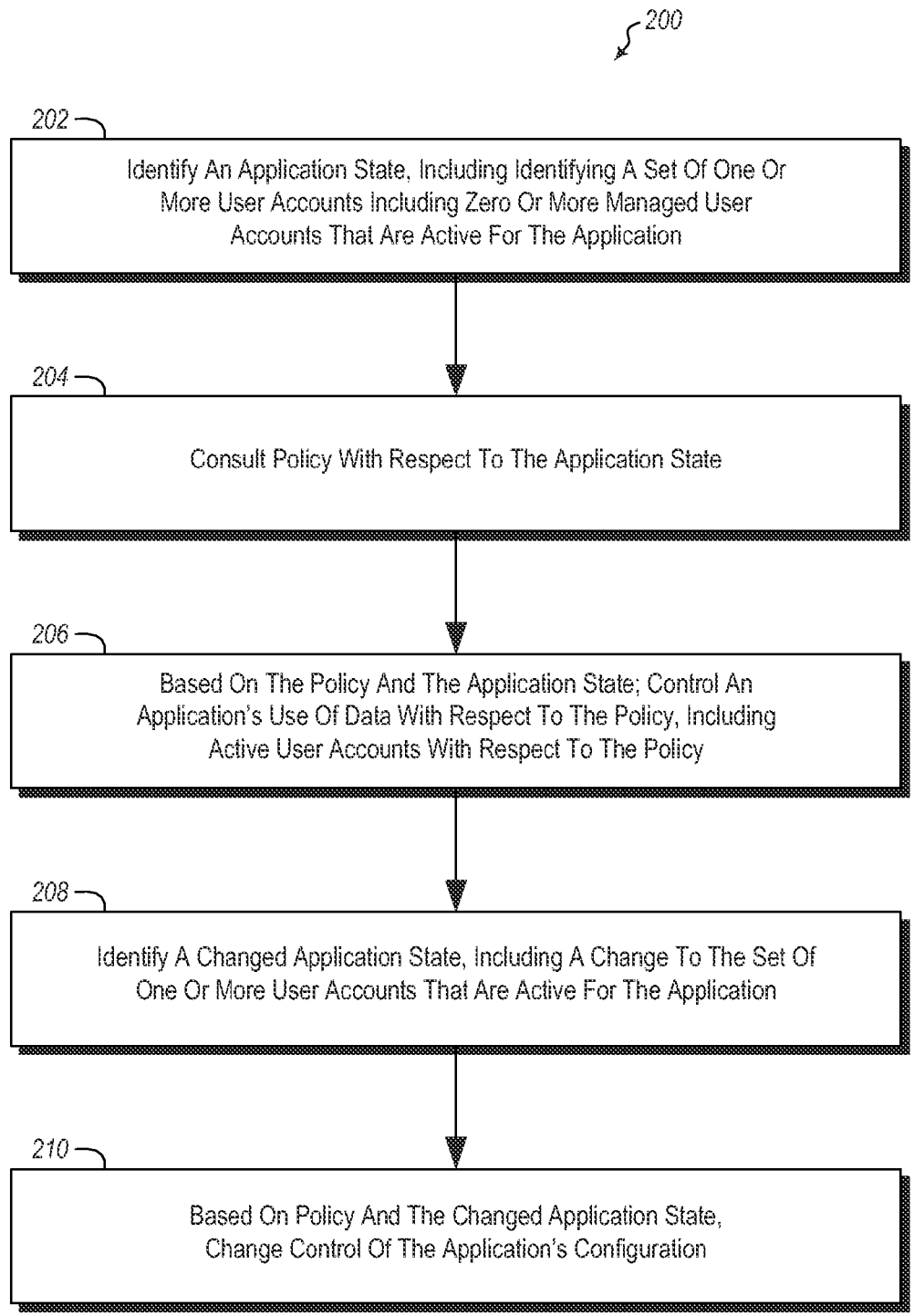
FIG. 2 illustrates a method of controlling application behavior in the context of managed accounts.

Referring now to FIG. 2, a method 200 is illustrated. The method 200 may be practiced in a computing environment. The method 200 includes acts for controlling application behavior in the context of managed accounts. Application behavior may be controlled, for example, with respect to data usage. In particular, for certain accounts, certain data usage behaviors may be restricted, as will be illustrated in more detail below.

The method 200 includes identifying an application state, including identifying a set of one or more user accounts including zero or more managed user accounts that are active for the application (act 202). For example, as illustrated in FIG. 1, an application 106-1 has associated with it a plurality of user accounts 108. This may include some managed accounts, such as accounts used to access an organization's resources. For example, the application 106-1 may be an email application. One of the accounts may be a user account for a user to access corporate email for their employer or a customer of the user (or the user's employer) when the user is a contractor. This account may be a managed account in that the corporation wishes to control how corporate data is used by the application 106-1 or the corporation may wish to ensure that the device 102 or the application 106-1 have certain safeguards implemented (such as passwords, data encryption, or other safeguards). Other accounts in the accounts 108 may be personal accounts or other accounts that are not managed. Thus, embodiments may want to identify which accounts are active. In one example, a determination of which account is active may be made by determining an account that is in focus. For example, a user may be able to select a folder, a view, or other interface element that brings a particular user account's data into focus. This may include, for example, making the data viewable, editable, or in some other way distinguish the data from other data used or usable by the application for other accounts. Alternatively, a user may be able to manually select an account from an account picker dialog box. Other methods of identifying an account may additionally or alternatively be used.

The method 200 further includes consulting policy with respect to the application state (act 204). The policy includes one or more different policies defined for managed user accounts. Each different policy defines application configuration controls for one or more managed user account. Thus, for example, FIG. 1 illustrates policies 112. These policies may define how data can be used and/or what restriction should be placed on data usage for various user accounts. Thus, for example, the application configuration controls may include controls on data usage. For example, policy may specify that cut/copy/paste functionality should be disabled for a particular user account. Alternatively or additionally, policy may specify that data cannot be backed up. The application configuration controls may alternatively or additionally include controls on data sharing. For example, the policy may specify that the application should not be able to share data outside of the application with other applications. The application configuration controls may alternatively or additionally include controls on encryption. For example, the policy may specify that data for a particular user account should be encrypted. The application configuration controls may alternatively or additionally include controls on account launch time checks (meaning when an account becomes active in the application due to either application launch or account changes). For example, the policy may indicate that when for a particular user account, a pin or password should be entered, or that a device should comply with certain policy or heath constraints. The application configuration controls may alternatively or additionally include controls on operating environments. For example, policy may specify that certain applications should not be running on the device when using one or more applications with a particular user account, i.e., certain applications should not be running at the same time. In another variant on data access, access to specific URLs could be allowed or blocked based on whitelist/blacklist for specific accounts in a managed browser.

The application configuration controls may include controls on graphical user interface features as defined by a management authority. For example, the controls may specify certain branding features be activated when a user account is being used for an application. Certain color palettes, text, images, logos, or other graphical user interface features may be specified.

The method 200 further includes, based on the policy and the application state; controlling an application's use of data with respect to the policy, including active user accounts with respect to the policy (act 206). For example, the client component may enforce the specified controls on data usage, data sharing, encryption, launch time checks, operating environments, etc. In some embodiments, control of the application's use of data may include changing the application user interface. For example, the application may be instructed to change the user interface to disable "Save as" or cut/copy/paste functionality when certain user accounts are active for an application.

The method 200 may be practiced where control of the application's use of data may include wiping data, refreshing data, changing an active account, etc.

The method 200 further includes identifying a changed application state, including a change to the set of one or more user accounts that are active for the application (act 208). For example, data for a different user account may be brought into focus for the application, or a different account may be selected by a user.

The method 200 further includes based on policy and the changed application state, changing control of the application's configuration (act 210). For example, due to a personal user account (or an organization account that is less restricted) being brought into focus, controls of the application's use of data may be relaxed to allow the application to perform additional functions on data.

The method 200 may be practiced where application state is global application state. This may also include cached state. Alternatively, the method 200 may be performed where the application state is thread state. Alternatively, the method 200 may be performed where the application state is process state. The application. They are hierarchical such that an application can have zero, one, or many processes, and a process can have one or many threads.

1. Global application state is state applicable throughout the entire app. This means that if the user is using the application and there is no specific thread or process state, embodiments will use the global state for the active account within the application. For example, when an example application is not running and simply exists installed on a computer, it has some state associated with it (this state may be "no active user" or "no permissions").
2. Process state is state applicable within a running instance of an application. This means that if the user is using the application and there is no specific thread state, embodiments will use the process state for the active account. To continue the previous example, if one launches the installed application, it's now running under a user account; this comes with some state (e.g. there may be some documents that one can edit that no one else can).

3. Thread state is state applicable within a process running in an application. This means that if the user is using the application, generally they will use the process state but may end up with threads running with different state. For example, if a coworker runs the installed application and starts uploading a very large document, closes the document, and then one were to continue running the application, there would still be a thread running in the background uploading the coworker's large document while there would be separate threads supporting the user's immediate use of the application.

The method 200 may be practiced where identifying a set of one or more user accounts is performed by the application and communicated to a management system client component. Alternatively, the method 200 may be practiced where identifying a set of one or more user accounts is performed by a client management entity. For example, this may be performed by an SDK, a management agent, a platform, etc.

The method 200 may be practiced where identifying a set of one or more accounts is performed by obtaining characteristics of a dataset. For example, embodiments may examine a file or a segment of a file, memory segment, etc. being operated on by an application to identify which user account is being used to while accessing an application. This may be performed by an application that identifies an account association. Alternatively, this may be performed by a client management entity (such as the client component 116) that determines account association with the dataset.

Embodiments of the method 200 may further include reporting application and identity compliance with policy. For example, such compliance may be reported to the management system 114. This can facilitate the management system 114 causing data to be wiped from the device 102, to inform an IT administrator for auditing purposes, or other management functions to be performed on the device 102.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, solid state storage devices, etc., which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include: Field-programmable Gate Arrays (FP- GAs), Application-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of controlling application behavior in the context of managed accounts, the method comprising:
    identifying an application state for an application;
    identifying a set of one or more user accounts that are active for the application;
    accessing a policy with respect to the application state, wherein the policy comprises one or more different policies defined for user accounts, wherein each different policy defines application configuration controls for one or more user accounts;
    based on the policy and the application state, controlling an application's configuration;
    identifying a changed application state including identifying a change to the set of one or more user accounts that are active for the application;
    determining that a particular user account has been brought into focus for the application; and
    based on policy, the changed application state, the change to the set of one or more user accounts that are active for the application, and the determination that the particular user account has been brought into focus, changing functionality of the application available to the set of one or more user accounts that are active for the application, the changing functionality including each of changing controls on data usage, changing controls on data sharing, and changing controls on data encryption.

2. The method of claim 1, wherein application state is global application state.

3. The method of claim 1, wherein application state is thread state.

4. The method of claim 1, wherein application state is process state.

5. The method of claim 1, wherein identifying a set of one or more user accounts is performed by the application and communicated to a management system client component.

6. The method of claim 1, wherein identifying a set of one or more user accounts is performed by a client management entity.

7. The method of claim 1, wherein the application configuration controls comprise controls on one or more of account launch time checks; or operating environment.

8. The method of claim 1, wherein the application configuration controls comprise graphical user interface features as defined by management authority.

9. The method of claim 1, wherein identifying a set of one or more accounts is performed by obtaining characteristics of a dataset.

10. The method of claim 9, wherein the application identifies an account association with a dataset.

11. The method of claim 9, wherein a client management entity determines account association with the dataset.

12. The method of claim 1, wherein controlling an application's configuration includes changing the application user interface.

13. The method of claim 1, wherein controlling an application's configuration includes changing the active user account.

14. The method of claim 1, wherein controlling an application's configuration includes one or more of wiping data, refreshing data, or changing an active account.

15. The method of claim 1, further comprising reporting application and identity compliance with policy.

16. A computing device configured to control application behavior in the context of managed accounts, the device comprising:
    one or more applications, wherein at least one of the applications is configured to be used with a plurality of user accounts; and
    computer executable instructions executing upon one or more processors which configure the computing device to:
        identify active user accounts for the at least one application including determining when focus for the at least one application changes from a first user to a second user;
        receive policy data that specifies application controls on a user account basis; and
        change available functionality of the at least one application based on the policy data, the identified active user accounts, and the determined change in focus, the changed functionality including each of changing controls on data usage, changing controls on data sharing, and changing controls on data encryption.

17. The computing device of claim 16, wherein the computing device is configured to receive information from applications identifying active user accounts.

18. The computing device of claim 16, wherein the computing device is configured to identify active user accounts by examining data sets being operated on by an application.

19. The computing device of claim 18, wherein the computing device is configured to examine at least one of a file, a segment of a file, or a memory segment to identify a user account for an application.

20. One or more computer-readable storage devices, wherein the one or more computer-readable devices comprise computer-executable instructions that when executed by one or more processors cause the following to be performed:
    identifying an application state for an application;
    identifying a set of one or more user accounts that are active for the application, a first particular user account of the one or more active accounts being in focus for the application;
    accessing a policy with respect to the application state, wherein the policy comprises one or more different policies defined on a user account basis, wherein each different policy defines application configuration controls for its respective user account;
    based on the policy and the application state, controlling an application's configuration;
    identifying a changed application state including identifying a change to the set of one or more user accounts that are active for the application and determining that a second particular user account has been brought into focus for the application; and
    based on policy, the changed application state and the change to the set of one or more user accounts that are active for the application, changing functionality of the application available to the set of one or more user accounts that are active for the application, the changing functionality including each of changing controls on data usage, changing controls on data sharing, and changing controls on data encryption.

* * * * *